Figure 1:
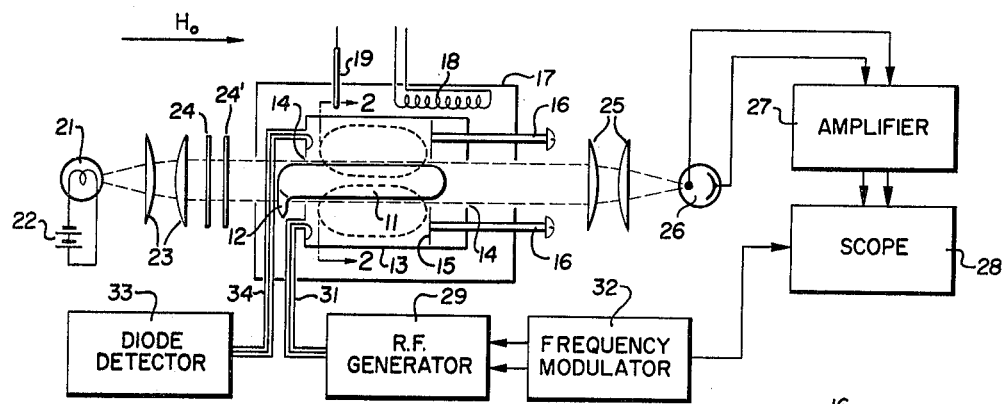

April 12, 1966  W. E. BELL ETAL  3,246,254
ATOMIC STABILIZED FREQUENCY SOURCE
Filed Feb. 21, 1958  2 Sheets-Sheet 1

INVENTORS
William E. Bell
Arnold L. Bloom
by Wm J. Nolan
Attorney

April 12, 1966   W. E. BELL ETAL   3,246,254
ATOMIC STABILIZED FREQUENCY SOURCE
Filed Feb. 21, 1958
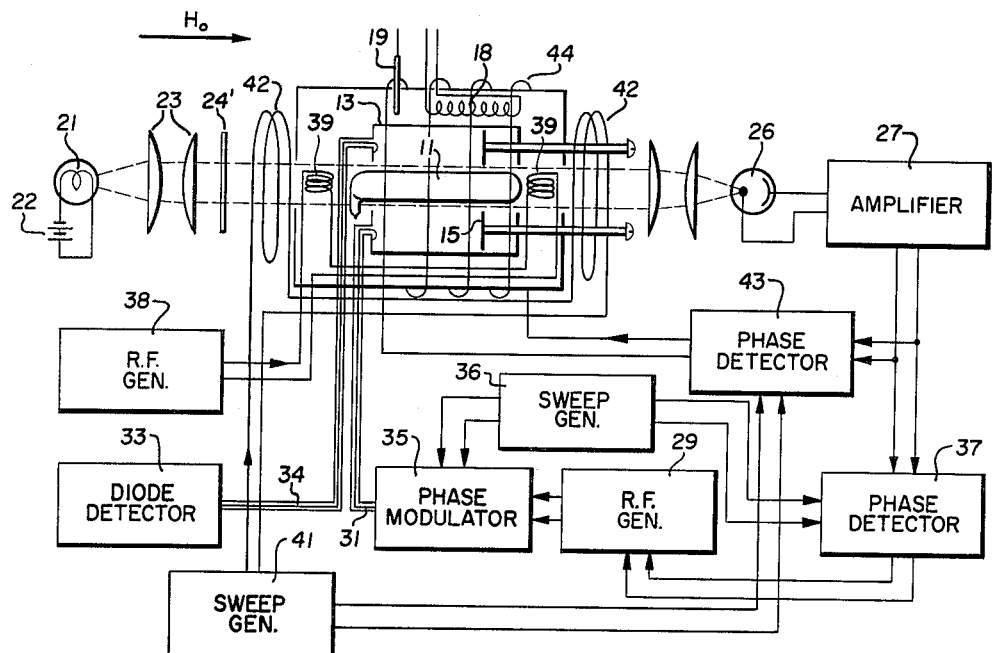
Fig. 5
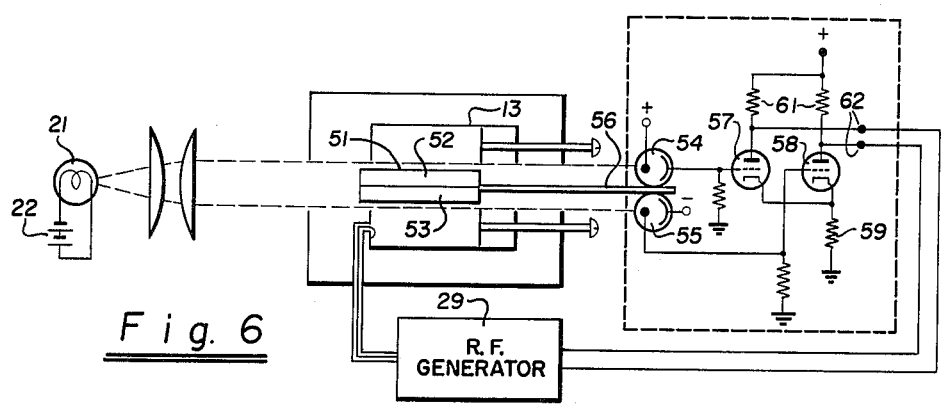
Fig. 6
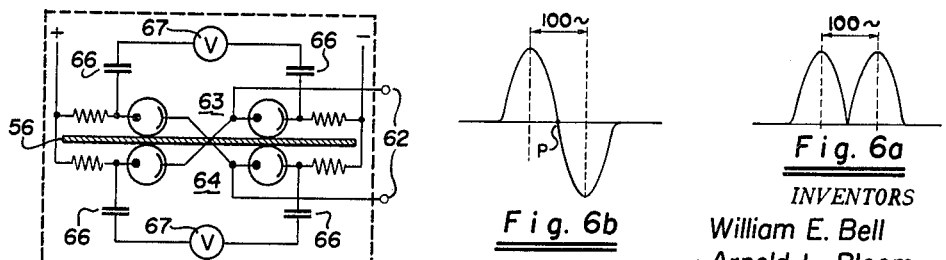
Fig. 7
Fig. 6b
Fig. 6a
INVENTORS
William E. Bell
Arnold L. Bloom
by Wm J. Nolan
Attorney United States Patent Office 3,246,254
Patented Apr. 12, 1966

3,246,254
ATOMIC STABILIZED FREQUENCY SOURCE
William E. Bell, Palo Alto, and Arnold L. Bloom, Los Altos, Calif., assignors to Varian Associates, Palo Alto, Calif., a corporation of California
Filed Feb. 21, 1958, Ser. No. 716,571
33 Claims. (Cl. 331—3)

This invention relates in general to physics phenomena and more particularly to novel improved methods and means utilizing optical absorption detection techniques for monitoring the orientation or alignment of atoms or analogous quantum systems.

The present invention provides novel methods and apparatus utilizing the recently discovered technique of monitoring the orientation or alignment of atoms or other analogous quantum systems by the absorption of an optical beam passing through the system. In the present application the optical absorption technique is expanded to provide novel improved methods and means for producing atomic clock frequency standards or stabilized oscillators, with or without magnetic field control.

It is, therefore, the object of the present invention to provide novel improved methods and means utilizing optical pumping and optical absorption detection of hyperfine and Larmor frequency resonance, particularly for use in producing atomic clocks or stabilized oscillators.

One feature of the present invention is the provision of a novel apparatus employing alkali metal atoms in buffer gases within a cavity resonator, the atoms being subjected to optical pumping, optical absorption detection being employed for measuring the hyperfine resonance occurring in the alkali substance.

Another feature of the present invention is the provision of a system of the above featured type wherein a feedback circuit is provided between the optical detection means and the radio frequency source producing the hyperfine transitions whereby the system may be utilized as an atomic clock or stabilized radio frequency oscillator.

Still another feature of the present invention is the provision of a system of the immediately preceding featured type wherein control of the magnetic field in which the atoms are aligned is accomplished by a feedback system utilizing the Larmor frequency resonance transitions in the atomic system for compensating for changes in the magnetic field.

Still another feature of the present invention is the provision of a novel system wherein hyperfine resonance transitions are induced in separate volumes of alkali atoms in which the resonance lines are shifted, the optical absorption in each volume of alkali atoms being compared by a difference amplifier to produce an error signal for controlling the radio frequency driving source inducing the hyperfine resonance transitions.

Still another feature of the present invention is the provision of a novel system of the immediately preceding featured type in which the optical detection apparatus utilized to detect the optical absorption at resonance is continuously tested to insure that the characteristics of the optical detecting means remains substantially constant.

Figure 2:
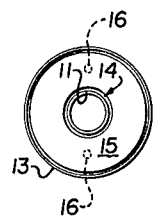
Figure 4:
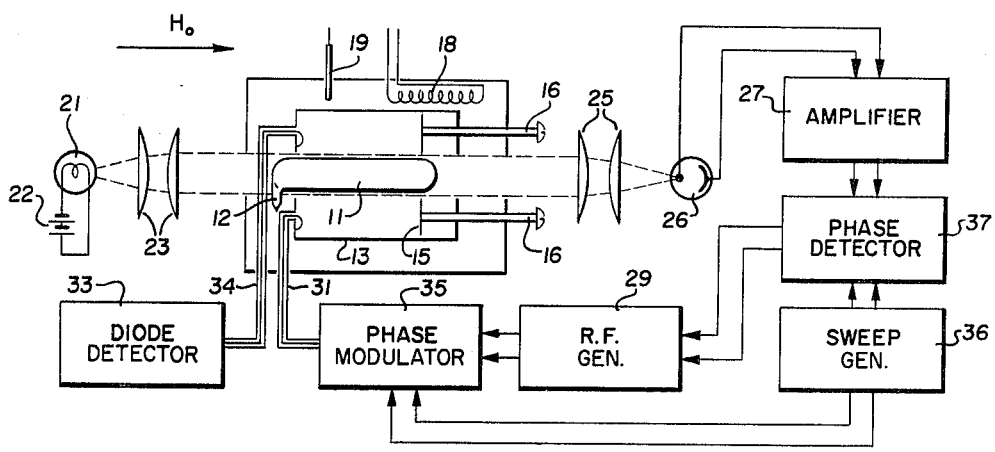
Figure 3:
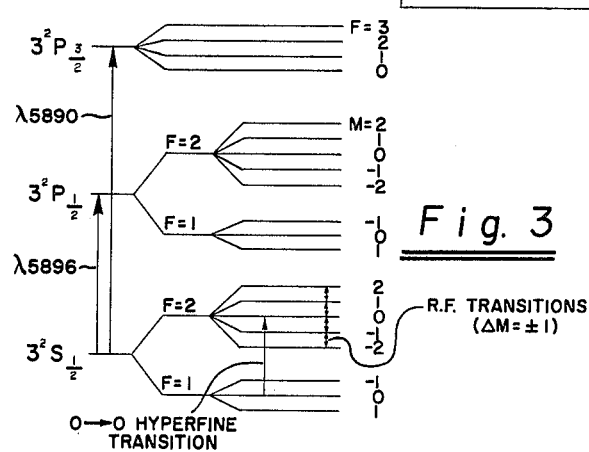

These and other features and advantages of the present invention will be more apparent after a perusal of the following specification taken in connection with the accompanying drawings wherein, FIG. 1 is a block diagram of one embodiment of the present invention in which the hyperfine resonance transitions in alkali vapors are optically detected, FIG. 2 is a cross sectional view taken along section lines 2—2 in FIG. 1, FIG. 3 is a schematic diagram depicting the energy levels of the sodium atoms of particular interest and the hyperfine and Larmor transitions therebetween, FIG. 4 is a block diagram of a novel frequency stabilized oscillator or atomic clock utilizing the teachings of the present invention, FIG. 5 is a block diagram of a novel atomic clock similar to that shown in FIG. 4 in which additional means are provided for compensating for changes in the aligning magnetic field, FIG. 6 is a block diagram of a novel atomic clock or frequency stabilized oscillator in which the use of phase or frequency modulation of the radio frequency driving signal may be eliminated, FIGS. 6a and 6b are traces of hyperfine resonances occurring in a system of the type shown in FIG. 6, and FIG. 7 is a circuit diagram of optical detection apparatus which may be utilized in place of the optical detection apparatus shown in the system of FIG. 6.

Referring now to FIGS. 1 and 2 there is shown one optical absorption system which utilizes an evacuated elongated substantially cylindrical glass absorption vessel 11 of about 200 cc. containing a small amount of metallic sodium in equilibrium with its vapor and containing argon at a pressure of about 100 mm. Hg. The metallic sodium is held in a small bulb extension 12 at the left hand end of the cylindrical vessel whereby it is held outside of the main volume of the glass vessel. The absorption vessel 11 is positioned within the axial center portion of a hollow cylindrical metallic cavity resonator 13 having closed ends, there being axial openings 14 in each of the closed ends, the vessel extending into the cavity through one of the end openings. An annular plate 15 is affixed to two or more adjusting screws 16 which are threaded through one end of the cavity resonator, the annular plate being movable within the cavity resonator by means of the screws for changing the dimensions and thereby adjusting the resonance frequency of the cavity. The cavity resonator 13 and associated absorption vessel 11 are placed within an oven 17 which has glass covered windows in the walls thereof aligned with the openings 14 in the cavity resonator, the internal temperature of the oven being kept at about 120° to 145° C. by means of a heating coil 18, a thermometer 19 being provided for indicating the temperature. The argon in the vessel 11 acts as a buffer gas for the sodium metal vapor and it results in the realization of a relaxation time of about .1 second for the alignment of the sodium atoms.

The ground or lowest energy state of the sodium atoms is the $3^2S_{1/2}$ level, which due to total angular momentum considerations, is split into two hyperfine states $F=1$ and $F=2$ (see FIG. 3). The vessel is located in a weak magnetic field $H_0$ which may, for example, be the earth's magnetic field, and the $F=1$ hyperfine state is split into three Zeeman sublevels $M=0, \pm 1$, while the $F=2$ hyperfine state is split into five Zeeman sublevels $M=0, \pm 1, \pm 2$, these Zeeman sublevels being spaced apart in the atomic spectrum by the Larmor frequency of the sodium atoms in the magnetic field $H_0$; in an earth's magnetic field of ½ gauss this Larmor frequency is a approximately 350 kc.

A source of optical radiation of λ5896 and λ5890 Angstrom units is provided comprising a commercial sodium arc lamp 21 operated from a battery 22, the lamp 21 being mounted in a Dewar (not shown). A General Electric type NA–1 sodium lamp has been employed; in recent potassium experiments an Osram potassium spectrum lamp was used. The radiation from this lamp 21 is focused by a condenser lens 23 through an interference filter 24 and a circularly polarizing sheet 24' into the absorption vessel. This circular polarizer 24' and interference filter 24 are optional as will be later explained. In this particular system the optical radiation is parallel to the weak magnetic field $H_0$ in which the apparatus is positioned and the circular polarization of the light is clockwise looking from the source to the vessel 11. The optical radiation after it has passed through the vessel and out of the cavity resonator is focused by a lens 25 upon a vacuum photocell 26 whose output is amplified by a conventional broad band amplifier 27 and displayed on an oscilloscope 28.

The λ5896 and λ5890 light incident on the front surface of vessel 11 starts traversing the sodium vapor and, according to the rules of quantum theory, is absorbed by the sodium atoms and raises these atoms from the $S_{1/2}$ ground state to the excited states $P_{1/2}$, $P_{3/2}$, where the energy thus absorbed is re-radiated as scattered light in all directions. The incident light at wavelengths λ5890 and λ5896 are in fact each composed of two components separated in wavelength by a very small amount, as has been demonstrated by experiments on high resolution optical spectrographs. Of these two components in each of the D-lines, one component acts to excite sodium atoms in the $F=1$ state and the other acts to excite atoms in the $F=2$ state. In a conventional sodium lamp, owing to the nature of the operating conditions, each of these two components is of very nearly the same intensity. However, it will be observed from the diagram of FIG. 3 that there are three magnetic sublevels in the $F=1$ state and five magnetic sublevels in the $F=2$ state. Thus if we assume that at the entry part of the absorption cell 11 there are an equal number of sodium atoms in all the ground state magnetic sublevels, there will be five sodium atoms to absorb light in the $F=2$ state for every three atoms in the $F=1$ state. It thus occurs that the light which excites atoms in the $F=2$ state is absorbed and scattered at a faster rate than the light which excites atoms in the $F=1$ state and this results, further on in the absorption cell 11, in an intensity difference between these optical components. The result of this is that at the exit end of the absorption cell 11 sodium atoms that are in the $F=1$ state absorb light at a faster rate than those in the $F=2$ state. Since all of the excited atoms have equal probability of returning to any magnetic sublevel, it turns out that a population difference or alignment is produced with respect to these two F states, with the $F=2$ state being more highly populated.

The process of producing a population difference in the absorption cell 11 can be expressed in concise mathematical form as follows: Let $I_1$ and $I_2$ be the intensity of the light exciting atoms in the $F=1$ and $F=2$ levels respectively. Let $z$ be the distance of any point in the absorption cell to the front surface. Then, taking $$I_1 = I_2 = 1$$

at $z=0$, we have $$I_1 = \tfrac{1}{3}(1+\sqrt{1+15e^{-kz}})$$

$$I_2 = \tfrac{1}{3}(-1+\sqrt{1+15e^{-kz}})$$

where $k$ is an attenuation parameter directly proportional to the density of sodium atoms in the light beam. At any point $z$ in the absorption cell the fraction of the total population that is in any $F=1$ state is given by $$\frac{I_1}{5I_1+3I_2}$$

and for any $F=2$ state by $$\frac{I_2}{5I_1+3I_2}$$

where $I_1$ and $I_2$ are computed by the above formulas. These formulas can be expected to be valid so long as atoms are excited by light faster than they are depolarized by thermal agitation. In our experimental conditions this can be expected to hold for $kz \leq 3$. At $kz=3$ the intensity $I_1$ is 4½ times greater than $I_2$; any $F=2$ state has 17½% of the total population and any $F=1$ state has only 4% of the total population. This should be contrasted with the equilibrium conditions when no incident light is present, where every $F=1$ and $F=2$ level has 12½% of the total population.

An additional effect on the population difference is provided by the optional circular polarizer 24' and interference filter 24. In accordance with quantum mechanics, these elements act to excite atoms in the ground state only to certain of the various sublevels of the $P_{1/2}$ state. For example, with the polarizer 24' shown and described above and in accordance with quantum theory selection rules, the circularly polarized light induces $\Delta M = +1$ transitions and atoms in the nonabsorbing sublevel $F=2$, $M=2$ of the ground state are not excited. Furthermore, in accordance with quantum theory, this light acts on atoms in the various ground state sublevels at different rates. Thus when these optional elements are employed there is produced in the sodium vapor, in addition to the population difference between the overall $F=1$, and $F=2$ states mentioned above, an additional population difference between the various magnetic sublevels in each of the $F=1$ and $F=2$ states. Whether or not the optional elements are used, the effect is that the magnetic sublevels which absorb less light gain atoms at the expense of the sublevels that absorb more light until eventually a saturation polarization is attained.

The amount of radiation absorbed by the sodium atoms may be determined by means of the photoelectric cell 26, the D.C. output of the photocell 26 being a direct function of the λ5896 and λ5890 radiation impinging thereon. Thus increased radiation absorption in the abosrption vessel 11 will result in a decrease in the D.C. output from the photocell 26 which may be viewed as an increased or decreased signal, by selection of suitable electrical amplification means 27, on the oscilloscope 28.

Since the amount of radiation absorbed will be directly related to the proportion of the sodium atoms in the more absorbing sublevels of the $3^2S_{1/2}$ state as opposed to those in the less absorbing sublevels, the measurement of such absorption affords a very useful means for determining, if in fact, the alignment of the atoms in the $3^2S_{1/2}$ energy state has actually occurred and to what extent. As stated above the pressure of the buffer gas utilized in a preferred embodiment of this invention is much higher than deemed usable in the past. Previous techniques involving the optical pumping of alkali atoms utilized buffer gas pressures of about 1 mm. Hg. and resulted in alignment of the optically excited states. The thermal relaxation process in optically excited states is much shorter than that in ground states and, unlike the ground state, the relaxation is caused in large degree by collisions between the alkali atoms and the buffer gas. So it comes about that the high buffer pressure (100 mm. Hg.) which in one preferred embodiment in this invention is essential to obtain long ground state relaxation times, the population distribution over the sublevels of the excited $^2P$ level is essentially randomized before emission occurs. Under these conditions the polarization of the resonance fluorescence approaches zero and the prior alignment monitoring schemes relying on it fail; this is not so, however, with the transmission monitoring scheme utilized in the present embodiments. In the latter one the alignment of the $^2S$ ground state alone counts while the disordering of the $^2P$ state is irrelevant.

A substantial increase of the λ5896 and λ5890 radiation absorption by the sodium atoms is accomplished by producing a hyperfine resonance realignment of the sodium atoms in the energy state $3^2S_{1/2}$ so as to cause transitions between various hyperfine sublevels. Thus, by applying radio frequency energy into the cavity resonator 13, by means of suitable signal generator 29 producing 1772 mc. and a coaxial coupling 31, a radio frequency magnetic field $H_1$ is produced in the cavity resonator parallel to the direction of the magnetic field $H_0$ (as depicted by the dotted lines in the cavity resonator) and of the hyperfine frequency (1772 mc.) of the sodium atoms. A resonance of the sodium atoms occurs wherein the transitions $F=2$; $M=0$ to $F=1$; $M=0$ is induced. The absorbing hyperfine sublevel ($F=1$; $M=0$) will now be populated at the expense of the less absorbing sublevel ($F=2$; $M=0$) during the hyperfine transitions. This increased population of the more absorbing level results in a substantial weakening of the $\lambda 5896$ and $\lambda 5890$ light detected by the photocell 26. By frequency modulating the radio frequency of generator 29 with an audio sweep by use of a suitable F.M. modulator 32, the point of maximum hyperfine resonance may be periodically swept through and viewed on the oscilloscope 28, the horizontal sweep plates of which are coupled to the F.M. modulator 32. It is apparent that phase modulation of the radio frequency generator output may be utilized to sweep through resonance rather than F.M. modulation. Thus the hyperfine resonance may be detected by the expedient of monitoring the alignment of the sodium atoms by the observation of the absorption of optical radiation utilized to initially optically pump the atoms.

It is noted that in the description above the radio frequency magnetic field $H_1$ was produced parallel to the direction of the magnetic field $H_0$. This parallel orientation gives $M=0$ to $M=0$ transitions and also certain other transitions, although the $0 \rightarrow 0$ transition is the most important. If the magnetic field $H_1$ in the cavity resonator was perpendicular to the direction of the magnetic field $H_0$ other transitions would occur but not the $0 \rightarrow 0$ transition.

A diode detector 33 is coupled into the cavity resonator 13 by means of a coaxial line 34, the diode detector serving to measure the power in the cavity resonator.

Since the frequency of the energy quanta $h\nu$ separating the hyperfine levels is a constant of nature and independent of the strength of the magnetic field $H_0$ (in weak fields) producing the level splitting, this hyperfine resonance technique may be utilized to produce a highly stabilized oscillator or atomic clock. One practical stabilized oscillator device or atomic clock is shown in FIG. 4. The radio frequency energy of the hyperfine resonance value (1772 mc. sodium) is supplied from the radio frequency generator 29 to a phase modulator 35 which is in turn coupled to a sweep generator 36. The phase modulator 35 modulates the output from the R.F. generator 29 in accordance with the frequency from the sweep generator (for example, 40 cycles) and supplies this modulated radio frequency energy to the cavity resonator 13. The radio frequency hyperfine transitions are induced in the sodium atoms and the optical absorption detected by the photocell 26. The output of the photocell 26 is coupled through the amplifier 27 to a phase detector 37 which receives its reference frequency signal from the sweep generator 36. The output of the phase detector 37 is a D.C. error signal, the sign of which is dependent on which side of maximum resonance the resonance signal is on and the amplitude of which is dependent on the amount that the resonance signal is off maximum resonance. The D.C. error output signal from the phase detector 37 is fed to a tuning circuit in the radio frequency generator 29 to tune the radio frequency generator to the frequency of maximum hyperfine resonance. The R.F. generator may be tuned in any convenient manner such as by controlling a small reversible D.C. motor in response to the D.C. output of the phase detector, this D.C. reversible motor serving to tune a reactive element in the generator 29 to control the frequency thereof. The frequency of the hyperfine resonance of this closed loop atomic resonance device is maintained very stable and thus this apparatus serves as a very efficient stabilized oscillator or atomic clock.

It was stated above that the hyperfine $0 \rightarrow 0$ transitions were independent of magnetic field $H_0$ in weak magnetic fields. It would probably be more accurate to say that these transitions are independent to a very substantial degree but are very slightly field dependent and become more field dependent as the strength of the field $H_0$ increases. There is shown in FIG. 5 an atomic clock system which is an improvement over the system of FIG. 4 in that it automatically compensates for any variation in magnetic field $H_0$ which may tend to change the hyperfine resonance frequency. In addition to the apparatus disclosed in FIG. 4 there is also provided in this system a second radio frequency generator 38, the output of which is coupled to a pair of radio frequency coils 39 positioned adjacent to the front and rear portion of the absorption vessel 11. This radio frequency generator 38 produces radio frequencies at the Larmor frequency of the atoms in the magnetic field $H_0$ (350 kc. in the case of sodium atoms in a ½ gauss field). An R.F. field $H_1$ of the Larmor frequencies of the sodium atoms is induced in the ends of the absorption vessel, this field $H_1$ being substantially perpendicular to the polarizing field $H_0$. Thus, in addition to the hyperfine transitions in the sodium atoms, there is also induced a Larmor resonance of the sodium atoms, that is, transitions between the magnetic sublevels in the ground state. An additional sweep generator 41 is provided coupled to a pair of sweep coils 42 which produces a modulation of the magnetic field $H_0$ and therefore sweeps the Larmor resonance. The polarizer 24' is essential in this embodiment to enable detection of the Zeeman transitions. The photocell 26 detects the optical absorption in the vessel 11 due to both the hyperfine resonance transitions and the Larmor frequency transitions. The output of the amplifier 27 is fed to a second phase detector 43, the reference signal for which is obtained from the sweep generator 41 utilized to sweep through the Larmor frequency resonance. Thus the output of this phase detector 43 is a D.C. error signal, the sign of which is dependent on which side of maximum resonance the Larmor resonance signal is on and the amplitude of which depends on the amount off resonance. The D.C. error output signal of this phase detector 43 is fed to a bias coil 44 which produces a magnetic field which serves to counterbalance any change in the magnetic field $H_0$. In addition, the phase detector 37 and sweep generator 36 are utilized as explained above with reference to FIG. 4 to maintain a very stable oscillation at the hyperfine resonance frequency.

The use of an atomic frequency standard or atomic clock as a stable frequency source requires that the system automatically stays within a small fraction of a line width of some particular atomic resonance such as the 1772 mc. of sodium. In the above described systems utilizing the field independent transitions, the correcting information for the radio frequency source exciting the resonance was obtained by a phase or frequency modulation of the source. FIG. 6 discloses a novel atomic clock system which avoids the use of frequency or phase modulation. It has been found that the center of resonance of the alkali vapor hyperfine lines may be shifted by varying the pressure of the buffer gas. The pressure shift is of the order of 10 cycles per millimeter of mercury in the alkali vapor buffer gas system. Thus with a potential line width of say 100 cycles, a difference of 10 millimeters of mercury in the alkali vapor buffer gas would shift the line by one full line width.

The absorption vessel 51 containing the sodium atoms is separated into two compartments 52 and 53. The sodium vapor in one compartment of the vessel is at a buffer gas pressure of about 100 mm. Hg. while the sodium vapor in the other half of the vessel is at a buffer gas pressure of about 90 mm. Hg. The type of resonance signal which a photocell would see as the light passes through both halves of the vessel 51 and as the sodium atoms in the two compartments go through resonance is shown in FIG. 6a, the points of maximum resonance of the two peaks being approximately 100 cycles apart. Assuming that two separate photocells are used for detecting the resonance optical absorption from the separate compartments and that the phase of one of the photocells is reversed, a signal of the type shown in FIG. 6b is obtained. It is desirous to maintain the system operating such that the signal output from the two photocells is maintained at the point P, the midpoint between the two resonance peaks. In the system of FIG. 6, two photocells 54 and 55 are utilized to detect the light absorption, a partition 56 being maintained between the beams of light to mutually isolate the two beams and associated photocells. The outputs of the two photocells 54 and 55 are connected to a difference amplifier which comprises a pair of triodes 57 and 58, the grid of triode 57 being coupled to the cathode of photoelectric cell 54 while the grid of triode 58 is coupled to the anode of the other photoelectric cell 55. The cathodes of the triodes are coupled through a bias resistor 59 to ground while the plates of the two triodes are coupled through load resistors 61 to the potential supply. As the light impinging on the first photocell 54 increases or decreases, the potential on the control grid of the first triode 57 goes more negative or positive, respectively, and the potential on the plate varies accordingly. Conversely, as the light impinging on the second photocell 55 increases or decreases, the potential on the control grid of the second triode 58 goes more positive or negative, respectively, and the potential on the plate varies in accordance therewith. With the system in balance, that is, with equal light intensities on both photocells (which occurs at the midpoint between the two resonance peaks), the potential on the two plates of the two triodes 57, 58 is identical and there is no D.C. potential at the difference amplifier output terminals 62. However, as the light intensities on the two photocells 54, 55 differ, a D.C. error potential occurs at the output terminals 62, the sign of which depends on which of the two photocells is receiving the greatest intensity of light and the amplitude of which depends on the intensity difference. This D.C. output is utilized to tune the R.F. generator 29 supplying the driving frequency to the cavity resonator to maintain the resonance at the center value P.

The system shown in FIG. 6, although very useful, may be subject at times to changes in light intensity on the photocell due to reasons other than the absorption of light in the absorption vessel 51. For example, should one of the photocells have a spot of dirt thereon which changes the light intensity it observes, a false D.C. output from the difference amplifier will be obtained and thus an incorrect tuning of the radio frequency generator 29. There is shown in FIG. 7 a system in which the photocells are under continuous test to insure that they are similar and have the same operating characteristics and that any light intensity changes indicated in the photocell are due to changes in the absorption of light from the light beams rather than to changes in the photocell characteristics such as the dirt spot mentioned above. The apparatus of FIG. 7 is substituted for the circuit in the dotted outline in FIG. 6. In this system there are two pairs of photocells 63 and 64 with the isolating partition 56 therebetween, each pair having the light from a separate one of the two compartments in the absorption vessel impinging thereon. The four photocells are connected in a bridge-type arrangement in which each of the photocells in one of the pair is series connected to a separate one of the photocells of the other pair. The midpoints between the series connected photocells serve as the D.C. signal output terminals 62 form this difference amplifier type bridge circuit. In each pair the anode of one photocell is coupled through coupling condensers 66 and an A.C. voltmeter 67 to the cathode of the other photocell. The optical radiation transmitted through the absorption vessel 51 to produce the resonance therein is amplitude modulated at the source 21 by a very low amplitude modulation of, for example, 1 kc. from a suitable source (not shown) coupled to the lamp 21. This very small ripple on the light has no effect on the resonance condition in the absorption vessel but the ripple is detected by the photocells. The intensity of this A.C. ripple is equal on all four of the photocells and, provided the photocells are of similar characteristics, the A.C. voltages on the cathodes and anodes of each pair will be equal and the A.C. voltmeters 67 will read zero. Thus, as long as both A.C. voltmeters 67 read zero, it is known that the four photocells have the same operating characteristics and any changes in the D.C. potential occurring at the output terminals 62 of this balance bridge type network will be due to changes in the intensity of the light impinging on the photocells rather than to any D.C. instability in the photocells.

Another method for obviating any possibility that a detected amplitude or intensity difference in the light was actually a D.C. instability in the photocell is to provide only one photocell for observing the light intensity coming from the two sections of the absorption vessel. This one photocell is utilized to observe the light intensity from both halves of the absorption vessel alternately. This could be accomplished in many ways well known to those in the art, for example, by a pair of oscillating mirrors, one mirror reflecting the light from the different sections of the absorption vessel onto the photocell alternately.

Although the above two-compartment absorption vessel systems were explained while utilizing the same buffer gases in the two compartments, it should be noted that when a neon buffer gas is utilized in place of an argon buffer gas the line shifts due to pressure are in opposite directions. Thus by utilizing argon as a buffer gas in one section of the absorption vessel and neon as a buffer gas in the other section, the system has a balance point which is temperature independent since temperature changes are offset in the two different sections.

Since many changes could be made in the above construction and many apparently widely different embodiments of this invention could be made without departing from the scope thereof it is intended that all matter contained in the above description or shown in the accompanying drawings shall be interpreted as illustrative and not in a limiting sense.

What is claimed is:

1. In combination, an absorption vessel having alkali atoms under vapor pressure therein and adapted to be positioned in an aligning magnetic field, a cavity resonator, said absorption vessel being positioned within said cavity resonator, said cavity resonator having openings in the walls thereof, a source of optical radiation for directing a beam through said openings in said cavity resonator and through said absorption vessel to optically pump said alkali atoms whereby said atoms become aligned in said alignment magnetic field, a source of radio frequency energy at the hyperfine resonance transition frequency of said atoms, means for coupling said radio frequency energy into said cavity resonator which is tuned to said resonance to produce said hyperfine resonance transitions, and an optical radiation detector means for intercepting said beam after it has passed out from said cavity resonator, said optical detector measuring changes in the light intensity of said beam due to the absorption of energy from said beam at the hyperfine resonance.

2. The combination as claimed in claim 1 wherein said cavity resonator is a hollow cylinder with end walls, said openings being in the end walls along the longitudinal axis, said absorption vessel being substantially cylindrical and extending along the longitudinal axis of said cavity resonator.

3. The combination as claimed in claim 1 including means for modulating the radio frequency energy applied to the atoms to sweep through the hyperfine resonance.

4. The combination as claimed in claim 3 wherein said last means comprises a frequency modulator for modulating the frequency of said radio frequency energy.

5. An atomic clock or stabilized frequency source comprising an absorption vessel containing alkali atoms under vapor pressure and adapted to be positioned in an aligning magnetic field, a cavity resonator, said vessel being positioned within said cavity resonator, said cavity resonator having openings in the walls thereof, a source of optical radiation for directing a beam through said wall openings and through said absorption vessel to optically pump said alkali atoms whereby said atoms become aligned in said alignment magnetic field, a source of radio frequency energy at the hyperfine resonance transition frequency of said atoms, means for coupling said radio frequency energy into said cavity resonator which is tuned to said resonance to produce said hyperfine resonance transitions, an optical radiation detector means for intercepting said beam after it has passed through said absorption vessel and producing an output signal in variable accordance with the light intensity, and means coupling said optical detector means to said radio freqeuncy source for tuning said radio frequency source in accordance with said output signal.

6. An atomic clock or stabilized frequency source as claimed in claim 5 wherein said last means comprises a phase detector circuit adapted to produce a D.C. error signal for controlling said radio frequency source to maintain said frequency at the hyperfine frequency.

7. An atomic clock or stabilized frequency source as claimed in claim 5 wherein said source of radio frequency energy comprises means for modulating the radio frequency to sweep through the hyperfine resonance.

8. An atomic clock or stabilized frequency source as claimed in claim 7 wherein said means coupling the optical detector means to the radio frequency source comprises a phase detector circuit coupled to said radio frequency modulating means.

9. An atomic clock or stabilized frequency source comprising an absorption vessel containing alkali atoms under vapor pressure and adapted to be positioned in an aligning magnetic field, a cavity resonator, said vessel being positioned within said cavity resonator, said cavity resonator having openings in the walls thereof, a source of optical radiation for directing a beam through said wall openings and through said absorption vessel to optically pump said alkali atoms whereby said atoms become aligned in said alignment magnetic field, a source of radio frequency energy at the hyperfine resonance transition frequency of said atoms, means for coupling said radio frequency energy to said cavity resonator which is tuned to said resonance to produce said hyperfine resonance transitions, a phase modulator and a sweep generator coupled to said radio frequency energy source to modulate the frequency output thereof at a sweep frequency such that the hyperfine resonance is swept through at the sweep generator frequency rate, an optical radiation detector means for intercepting said beam after it has passed through said absorption vessel and producing an output signal in variable accordance with the light intensity, and a phase detector coupled to the output of said radiation detector means and coupled to said sweep generator for producing an error signal for controlling said radio frequency source to maintain the output frequency of said source at the hyperfine resonance frequency value.

10. An atomic clock or stabilized frequency source as claimed in claim 9 wherein said cavity resonator is a hollow cylinder with end walls, said openings being in the end walls along the longitudinal axis, said absorption vessel being substantially cylindrical and extending along the longitudinal axis of said cavity resonator.

11. In combination, an absorption vessel containing alkali atoms under vapor pressure and adapted to be positioned in an aligning magnetic field, a source of optical radiation for directing the beam through said absorption vessel to optically pump said alkali atoms whereby said atoms become aligned in said alignment magnetic field, a first source of radio frequency energy at the hyperfine resonance transition frequency of said atoms coupled to said absorption vessel to produce said hyperfine resonance transitions, a second source of radio frequency energy at the Larmor resonance transition frequency of said atoms coupled to said absorption vessel to produce said Larmor resonance transitions, an optical radiation detector means for intercepting said beam after it has passed through said absorption vessel and producing an output signal in variable accordance with the light intensity of said beam, first means coupling said optical detector means to said first radio frequency source for maintaining said first radio frequency source at the hyperfine resonance frequency, and second means coupled to said optical detector means for controlling the strength of said aligning magnetic field in accordance with the output signal from said optical radiation detector means.

12. An atomic clock or stabilized oscillator source as claimed in claim 11 wherein said first means comprises a first low frequency modulating means coupled to said first radio frequency source for modulating the output thereof to thereby sweep through the hyperfine resonance, and a first phase detector circuit coupled to said first modulating means and said optical detector means for producing an output error signal for controlling the frequency of said radio frequency generator, and wherein said second means comprises a second low frequency modulating means modulating the alignment magnetic field to thereby sweep through the Larmor frequency resonance, and a second phase detector circuit coupled to the output of said optical radiation detector and to said second modulating means, the output of which is coupled to a biasing coil for changing the strength of the aligning magnetic field.

13. In combination, an absorption vessel adapted to be positioned in an aligning magnetic field and having a plurality of separate compartments therein and alkali atoms with buffer gases under vapor pressure located in the compartments, the characteristics of the buffer gases in the different compartments being different, a source of optical radiation for directing a beam through the compartments of said absorption vessel to optically pump said alkali atoms in the separate compartments whereby said atoms become aligned in said alignment magnetic field, a source of radio frequency energy at the hyperfine resonance transition frequency of said atoms coupled to said absorption vessel to produce hyperfine resonance transitions of the atoms in the different compartments, the point of maximum hyperfine resonance transition of the atoms being separated slightly due to the differences in the buffer gas characteristics, optical radiation detector means for intercepting said beam after it has passed through said absorption vessel and producing an output signal in variable accordance with the light intensity of the beam, and means coupling said optical radiation detector means to said radio frequency source for tuning said radio frequency source in accordance with said output signal.

14. The combination as claimed in claim 13 wherein said difference in the characteristics of said buffer gases is a difference in pressure.

15. The combination as claimed in claim 13 wherein said difference in the characteristics of said buffer gases is produced by a difference in the type of buffer gas.

16. The combination as claimed in claim 13 wherein said optical radiation detector means comprises a pair of photocells, each intercepting the light from a separate one of the compartments, and wherein said last means comprises a differential amplifier coupled to said photocells for producing an output signal in variable accordance with the difference in light intensity on the photocells.

17. The combination as claimed in claim 13 wherein said optical radiation detector means comprises two pairs of photocells arranged so that the light from the separate compartments impinges on the separate pairs, each of the photocells in one pair being series connected with a separate one of the photocells in the other pair, means for producing an A.C. ripple on the optical radiation from said source, and means for measuring the A.C. voltage across each pair of photocells.

18. In combination, an absorption vessel containing an assemblage of quantum systems characterized by a hyperfine energy level splitting, a cavity resonator, said absorption vessel being positioned within said cavity resonator, said cavity resonator having openings in the walls thereof, optical radiation means for directing an alignment detecting optical beam through said wall openings and through said absorption vessel, a source of radio frequency energy at the hyperfine resonance transition frequency of said quantum systems, means for coupling said radio frequency energy into said cavity resonator which is tuned to said resonance to produce said hyperfine transitions, and optical radiation detector means intercepting said beam after it has passed out from said cavity resonator, said optical detector means measuring changes in the intensity of said beam due to the absorption of energy from said beam at the hyperfine resonance.

19. In combination, an absorption vessel containing an assemblage of quantum systems characterized by a hyperfine energy level splitting and adapted to be positioned in an aligning magnetic field, optical radiation means for directing alignment detecting optical radiation through said vessel, a first source of radio frequency energy at the hyperfine resonance transition frequency of said quantum systems coupled to said absorption vessel, a second source of radio frequency energy at the Larmor resonance transition frequency of said quantum system in said magnetic field, optical detection means for intercepting said optical radiation after it has passed through said absorption vessel, first means coupled to said optical detection means for deriving a signal responsive to changes in alignment which are due to said hyperfine frequency energy, second means coupled to said optical detection means for deriving a signal responsive to changes in alignment which are due to said Larmor frequency energy, and means responsive to said second means for controlling the strength of said aligning magnetic field.

20. The combination as claimed in claim 18 further including a second source of radio frequency energy at the Larmor resonance transition frequency of said quantum systems, and means coupling said second source to said absorption vessel for producing Larmor resonance transitions.

21. In combination, a microwave resonant gas; means for optically pumping the gas; means for applying a weak magnetic field to the gas; means for applying energy to the gas the magnetic field of which is perpendicular to that of the weak magnetic field at a frequency characteristic of transitions between magnetic substates $m_F$ of one level of the ground state of the gas; and means for applying microwaves to the gas at a microwave resonant frequency thereof.

22. Atomic apparatus comprising, in combination, an atomic substance, an energy source supplying energy for a first transition at a first transition frequency of said substance, means subjecting said substance to said energy, means developing a first signal dependent on the number of particles in said substance undergoing a transition at said first frequency, means controlling the frequency of said source in response to said first signal, field applying means for subjecting said substance to a static field affecting said first transition frequency, a stable generator supplying energy for a second transition at a second transition frequency of said substance dependent on said static field, means subjecting said substance to said energy at said second frequency, means developing a second output signal related to the number of particles in said substance undergoing said transition at said second frequency, and means controlling said static field in response to said second output signal to maximize the number of particles undergoing said transition at said second frequency.

23. The combination defined in claim 22 in which the transition at said first frequency is a magnetically induced transition and said field applying means subjects said substance to a static magnetic field.

24. The combination defined in claim 23 in which said transition at said second frequency is magnetically induced.

25. The combination defined in claim 22 in which the derivative of the frequency of said first transition with respect to said static field is substantially less at the static field value of said first frequency than the derivative of the frequency of said second transition with respect to said static field.

26. Atomic apparatus comprising, in combination, an atomic substance having like atoms, a generator having an output at a first frequency corresponding to a first energy level transition of said atoms, first energy storing means excited by said generator for subjecting said substance to radiation at said first frequency, field applying means for subjecting said substance to a static field affecting the frequency of said first transition, said generator having a second output frequency lower than said first frequency and corresponding to a second energy level transition of said atoms, second energy storage means excited by said generator for subjecting said substance at spaced intervals to radiation at said second frequency, the frequency of said second transition being more dependent on said static field than the frequency of said first transition, means for developing a first signal related to the number of atoms in said substance undergoing said first transition, means for developing a second signal related to the number of atoms in said substance undergoing said second transition, means for controlling the frequency of said generator in response to said first signal so as to maximize the number of atoms undergoing said first transition, and means for controlling said static field in response to said second signal so as to maximize the number of atoms undergoing said second transition.

27. Atomic apparatus comprising, in combination, an atomic substance, an energy source supplying energy for a first transition at a first transition frequency of said substance, means subjecting said substance to said energy, means developing a first signal dependent on the number of particles in said substance undergoing transition at said first frequency, means controlling the frequency of said source in response to said first signal, said atomic substance being disposed in a static field affecting said first transition frequency, a stable generator supplying energy for a second transition at a second transition frequency of said substance dependent on said static field, means subjecting said substance to said energy at said second frequency, means developing a second output signal related to the number of particles in said subtsance undergoing said transition at said second frequency, and means controlling said static field in response to said second output signal to maximize the number of particles undergoing said transition at said second frequency.

28. Atomic apparatus comprising, in combination, an atomic substance having like atoms, a generator having an output at a first frequency corresponding to a first energy level transition of said atoms, first energy storing means excited by said generator for subjecting said substance to radiation at said first frequency, said atomic substance being disposed in a static field affecting the frequency of said first transition, said generator having a second output frequency lower than said first frequency and corresponding to a second energy level transition of said atoms, second energy storage means exicted by said generator for subjecting said substance at spaced intervals to radiation at said second frequency, the frequency of said second transition being more dependent on said static field than the frequency of said first transition, means for developing a first signal related to the number of atoms in said substance undergoing said first transition, means for developing a second signal related to the number of atoms in said substance undergoing said second transition, means for controlling the frequency of said generator in response to said first signal so as to maximize the number of atoms undergoing said first transition, and means for controlling said static field in response to said second signal so as to maximize the number of atoms undergoing said second transition.

29. Atomic apparatus comprising, in combination, an atomic substance located in an aligning magnetic field, an energy source supplying energy for a first transition at a first transition frequency of said substance to cause resonance of the atoms in the substance at such first frequency, means subjecting said substance to said energy, means developing a first signal dependent on the resonance of said substance undergoing a transition at said first frequency, means controlling the frequency of said source in response to said first signal, a stable generator supplying energy for a second transition at a second transition frequency of said substance dependent on said aligning field, means subjecting said substnace to said energy at said second frequency to cause resonance of the atoms in the substance at such second frequency, means developing a second output signal related to the resonance of said substance undergoing said transition at said second frequency, and means for varying said aligning magnetic field in response to said second output signal to provide maximum resonance at said second frequency.

30. The combination defined in claim 29 in which said transition at said second frequency is magnetically induced.

31. The combination defined in claim 29 which the derivative of the frequency of said first transition with respect to said aligning magnetic field is substantially less at the aligning field value of said first frequency than the derivative of the frequency of said second transition with respect to said aligning field.

32. Atomic apparatus comprising, in combination, an atomic substance having like atoms located in an aligning magnetic field, a first generator having an output at a first frequency corresponding to a first energy level transition of said atoms, first energy storing means excited by said first generator for subjecting said substance to radiation at said first frequency, a second generator having a second output frequency lower than said first frequency and corresponding to a second energy level transition of said atoms, second energy storage means excited by said second generator for subjecting said substance at spaced intervals to radiation at said second frequency, the frequency of said second transition being more dependent on said aligning field than the frequency of said first transition, means for developing a first signal related to the resonance of the atoms in said substance undergoing said first transition, means for developing a second signal related to the resonance of the atoms in said substance undergoing said second transition, means for controlling the frequency of said first generator in response to said first signal so as to provide maximum resonance of the atoms undergoing said first transition, and means for varying said aligning field in response to said second signal so as to provide maximum resonance of the atoms undergoing said second transition.

33. Atomic apparatus comprising, in combination, an atomic substance having like atoms, generator means having an output at a first frequency corresponding to a first energy level transition of said atoms, first energy storing means excited by said generator means for subjecting said substance to radiation at said first frequency to provide resonance at such first frequency, said atomic substance being disposed in a static field affecting the frequency of said first transition, said generator means having a second output frequency lower than said first frequency and corresponding to a second energy level transition of said atoms, second energy storage means excited by said generator means for subjecting said substance at spaced intervals to radiation at said second frequency to provide resonance at such second frequency, the frequency of said second transition being more dependent on said static field than the frequency of said first transition, means for developing a first signal related to the resonance of the atoms in said substance undergoing said first transition, means for developing a second signal related to the resonance of the atoms in said substance undergoing said second transition, means for controlling the frequency of said generator means in response to said first signal so as to provide maximum resonance of the atoms undergoing said first transition, and means for varying said static field in response to said second signal so as to provide maximum resonance of the atoms undergoing said second transition.

References Cited by the Examiner

UNITED STATES PATENTS

| 2,707,235 | 4/1955 | Townes. |
| 2,714,660 | 8/1955 | Hershberger. |
| 2,745,014 | 5/1956 | Norton. |
| 2,836,722 | 5/1958 | Dicke et al. _____ 331—3 |
| 2,884,524 | 4/1959 | Dicke _____ 331—94 |

OTHER REFERENCES

"Optical Methods of Atomic Orientation and of Magnetic Resonance" by Kastler, in the Journal of the Optical Society of America, vol. 47, No. 6, pages 460–465, June 1957.

"Spin Resonance of Free Electrons Polarized by Exchange Collisions" by Dehmelt, in the Physical Review, vol. 109, No. 2, pages 381-385 Jan. 15, 1958.

ROY LAKE, *Primary Examiner.*

JOHN E. LADY, GEORGE N. WESTBY, BENNETT G. MILLER, *Examiners.*